(12) United States Patent
Landry et al.

(10) Patent No.: US 8,443,212 B2
(45) Date of Patent: May 14, 2013

(54) AUTOMATED BATTERY CALIBRATION

(75) Inventors: John A. Landry, Spring, TX (US);
Robert D. Matthews, Sugarland, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 706 days.

(21) Appl. No.: 12/641,654

(22) Filed: Dec. 18, 2009

(65) Prior Publication Data

US 2011/0154005 A1  Jun. 23, 2011

(51) Int. Cl.
*G06F 13/32* (2006.01)
(52) U.S. Cl.
USPC ........... 713/300; 713/310; 713/320; 713/321; 713/322; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| | | | | |
|---|---|---|---|---|
| 5,841,285 A * | 11/1998 | Bailey | ............................ | 324/435 |
| 5,914,609 A * | 6/1999 | Curry et al. | .................... | 324/601 |
| 5,963,017 A * | 10/1999 | Yeh et al. | ....................... | 320/132 |
| 6,100,666 A * | 8/2000 | Ryu | ............................... | 320/132 |
| 6,463,545 B1 | 10/2002 | Fisher et al. | | |
| 6,486,636 B1 * | 11/2002 | Stolitzka et al. | ............... | 320/134 |
| 6,630,814 B2 * | 10/2003 | Ptasinski et al. | ............... | 320/132 |
| 7,877,631 B2 * | 1/2011 | Eastman | .......................... | 714/22 |
| 2007/0096689 A1 * | 5/2007 | Wozniak | ........................ | 320/112 |
| 2007/0216361 A1 * | 9/2007 | Zelinski et al. | ................ | 320/132 |
| 2009/0177922 A1 * | 7/2009 | Eastman | .......................... | 714/25 |

* cited by examiner

*Primary Examiner* — M Elamin

(57) ABSTRACT

A computing device executes a boot process. During boot process execution, the computing device initiates automatic calibration of a battery connected to the computing device.

14 Claims, 4 Drawing Sheets

AUTOMATED BATTERY CALIBRATION

BACKGROUND

The use of batteries facilitates the portability of various computing devices (e.g., notebooks, handheld devices, etc.). Due to the nature of various rechargeable batteries, it is commonly recommended that they be periodically calibrated to assure maximum battery life between charges.

BRIEF DESCRIPTION OF DRAWINGS

The following description includes discussion of figures having illustrations given by way of example of implementations of embodiments of the invention.

DETAILED DESCRIPTION

As provided herein, portable computing device batteries may be calibrated automatically without manual participation by a user. As described, various methods and systems leverage the Extensible Firmware Interface (EFI) specification promulgated by the Unified EFI (UEFI) Forum—headquartered in Beaverton, Oreg. —to automate the calibration of a battery outside of an operating system environment.

As described herein, UEFI can be used to bypass certain power management functionality that may be built into the operating system (OS) of a battery-connected portable computing device. Bypassing OS power management functionality allows the battery to cycle from a fully charged state to a fully discharged state without interruptions caused by standby and/or hibernation states that may be enabled. Without bypassing OS power management, the OS may not allow the battery to discharge fully or remain idle during normal system operation.

In various embodiments, a calibration application in the UEFI environment is single-threaded, allowing complete control of system hardware resources. In addition, the UEFI environment can interlace with battery control logic to control charging and discharging of the battery. The UEFI environment also controls the calibration process, which may be triggered by various mechanisms described in more detail below.

Figure 1:
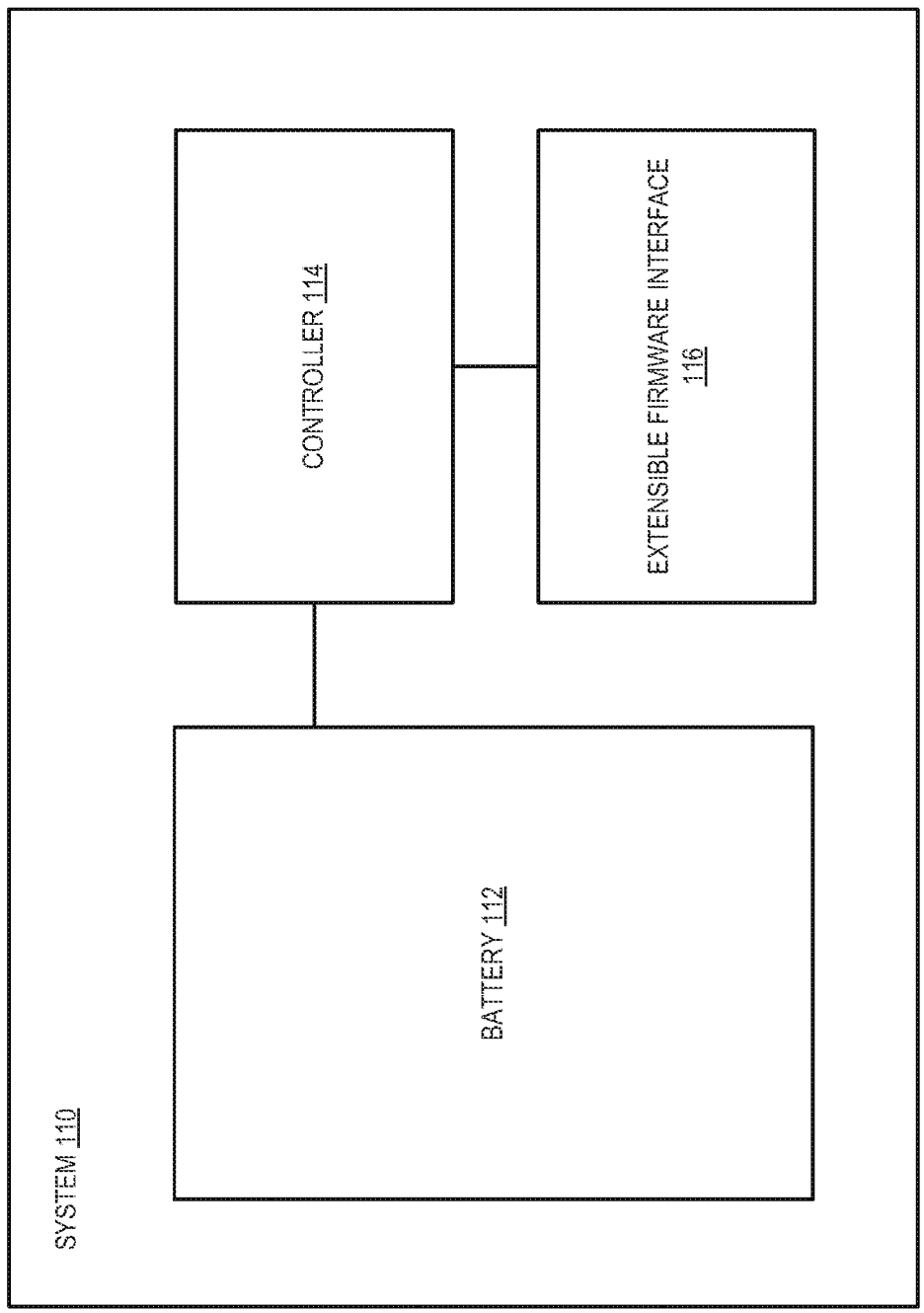
FIG. 1 is a block diagram illustrating a system according to various embodiments.

FIG. 1 is a block diagram illustrating a system according to various embodiments. System 110 represents any type of computing device that, at least some of the time, relies on one or more rechargeable batteries to power the device. Such devices might include notebooks, handheld devices, tablet computers, etc. System 110 includes a battery 112, a controller 114 and an extensible firmware interface 116. Battery 112 can be one of various types of rechargeable batteries, including "smart" batteries, used in portable computing devices, such as lithium-ion (Li+), nickel cadmium (NiCd), nickel metal hydride (NiMH) batteries and the like. Controller 114 serves as an interface between the battery 112 and EFI 116. In various embodiments, controller 114 could be a battery-specific microcontroller, while in other embodiments, controller 114 could be a keyboard controller or other suitable controller capable of interfacing with an EFI environment and the battery.

In various embodiments, EFI 116 serves as a runtime interface between system hardware/firmware and an operating system. Specifically, in certain embodiments, EFI 116 is a UEFI environment that may be integrated with or replace traditional basic input/output system (BIOS) firmware. Other suitable interfaces could be used in different embodiments. In various embodiments, EFI 116 also serves as a boot loader for system 110, performing the boot sequence for system 110 and loading the operating system for system 110.

In various embodiments, EFI 116 performs automated calibration of battery 112 during execution of a system boot process. Based on a trigger (e.g., user manual launch, battery cycle counter, battery error status, etc.), EFI 116 determines the type and/or state of battery 112 and initiates battery calibration. EFI 116 controls the charging and/or discharging of battery 112 based on the determined battery type. Once the calibration process is completed, the boot process executes to completion and the operating system is loaded and given control of system 110.

Figure 2:
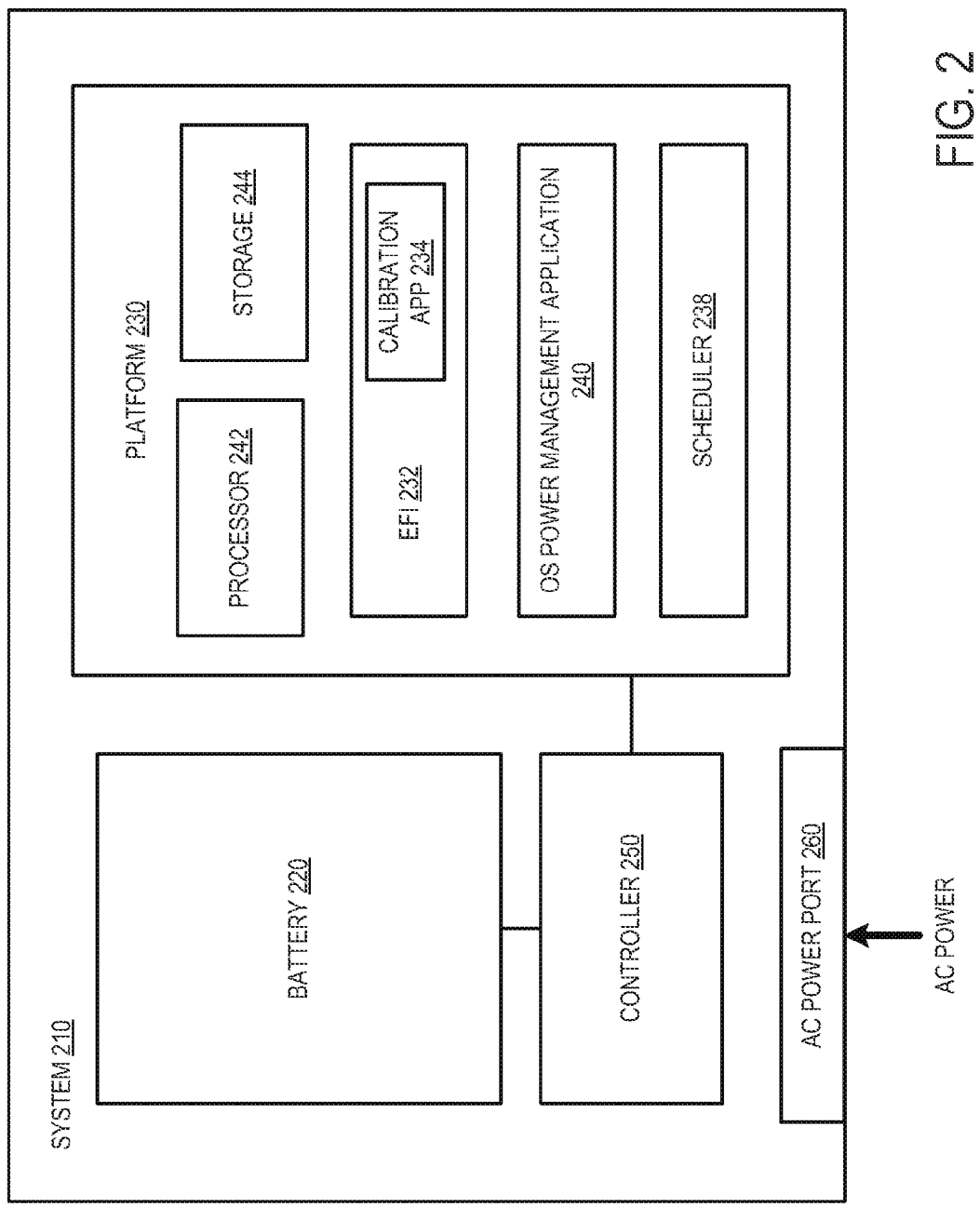
FIG. 2 is a block diagram illustrating a system according to various embodiments.

FIG. 2 is a block diagram illustrating another system according to various embodiments. Similar to system 110 of FIG. 1, system 210 can be any type of computing device that, at least some of the time, relies on one or more rechargeable batteries to power the device (e.g., portable computing devices). Such computing devices might include notebooks, handheld devices, tablet computers, etc. Battery 220 can be any suitable type of rechargeable battery, such as those described above. Likewise, controller 250 can be a battery microcontroller, a keyboard controller or any other controller capable of interfacing between battery 220 and an extensible firmware interface (e.g., EFI 232).

Platform 230, along with various components illustrated within platform 230, may be implemented on one or more hardware modules, special-purpose hardware (e.g., application specific hardware, application specific integrated circuits (ASICs), embedded controllers, hardwired circuitry, etc.), a computer-readable storage medium (e.g., storage 244) with instructions executed by a processor 242, or some combination of these.

In various embodiments, a single-threaded calibration application 234 is capable of arresting control of all system hardware on system 210, effectively allowing complete control of system 210. Calibration application 234 also interfaces with controller 250 to control charging and discharging of battery 220. EFI 232 initiates calibration of battery 220 in response to detecting and/or receiving one or more of a plurality of triggers including, but not limited to, the following:

User manually launches calibration application 234 during boot process
  EFI 232 detects battery condition such as threshold cycle count, error status, etc.
  Operating system application 240 schedules battery calibration In situations where operating system application 240 triggers the battery calibration, a command (e.g., a Windows management interface (WMI) command) is used to set a flag in EFI 232 to launch calibration application 234 on the next system restart. Scheduler 238 can be a function of OS application 240 to handle battery calibration scheduling or scheduler 238 can be a separate module (e.g., implemented in hardware, special-purpose hardware, a computer readable medium, etc.) to schedule and/or trigger battery calibration on some periodic basis.

When calibration application 234 is launched by EFI 232 (e.g., during execution of a boot process), calibration application 234 reads the battery properties of battery 220 to determine the type and/or state of the battery. The battery type may be determined during an initial launch of calibration application 234 (and subsequently stored) or it could be determined each time calibration application 234 is launched.

Based at least in part on the battery type, battery calibration is performed. Various processes for calibrating battery 220 may be used, including, but not limited to the following:

Process 1: Charge fully, discharge fully, charge fully. In this process, calibration application 234 checks for AC power 260. If no AC power is detected, calibration is aborted. In such a case, the user may be notified of the aborted calibration. If AC power is detected, calibration application 234 allows the battery to fully charge until system 210 provides an indication that the charging is complete. Calibration application 234 then directs controller 250 to disable AC power 260 to system 210 and discharge battery 220. Calibration application 234 is able to direct controller 250 via an interface protocol defined for system 210.

In various embodiments, a constant load is applied to battery 220 during the discharging process. For example, a constant load may be applied while discharging a lithium-ion battery. Given that EFI 232 is single-threaded, allowing it to arrest control of platform 230 hardware, calibration application 234 can direct platform 230 hardware to consistently draw the same amount of power during the calibration, thereby maintaining a constant load.

When battery 220 is discharged to some threshold remaining charge level (e.g., 5%), controller 250 automatically resets the battery charge control to charge battery 220 via AC power 260. In various embodiments, calibration application 234 causes the load being applied to system 210 to be removed, further allowing battery 220 to charge. In some embodiments, after fully charging a second time, calibration application 234 provides an indication to a user of system 210 that calibration has completed. In certain embodiments where calibration application 234 is launched automatically by EFI 232 during a boot process, calibration application 234 closes upon completion of calibration and system 210 proceeds to startup via the boot process.

Process 2: Charge fully, discharge fully. Process 2 is similar to Process 1 without the final charge of battery 220. The time to complete calibration using Process 2 is shorter than that of Process 1.

Process 3: Set battery in idle state (no charge or discharge) for a specified period of time (e.g. 2.5 hours). Process 3 is similar to Process 1, except that battery 220 is not charge or discharged. Instead, calibration application 234 sets battery 220 to an idle state by issuing a shutdown command to battery 220. Battery 220 remains in shutdown for the specified calibration time. Once battery 220 has been idle for the specified period time, calibration application 234 issues a command to remove battery 220 from the idle state.

Variations to the processes described above may be used in different embodiments. For example, a single charge-only process could be used in certain embodiments. Also, process steps may occur in a different order and more steps or fewer steps could be used based on the system and/or battery type.

Figure 3:
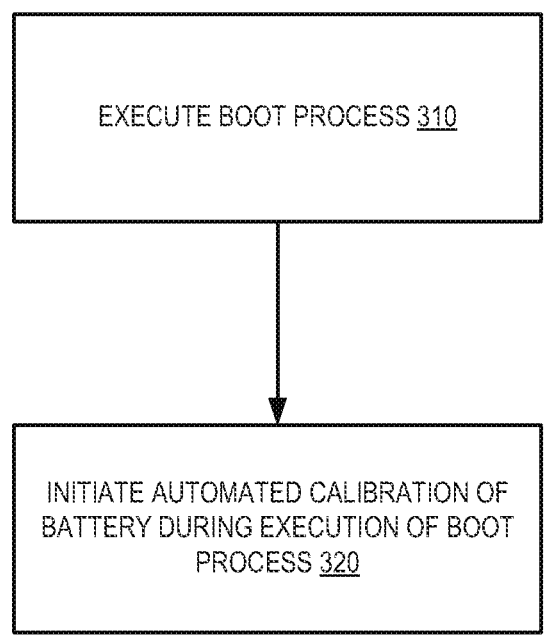
FIG. 3 is a flow diagram of operation in a system according to various embodiments.

FIG. 3 is a flow diagram of operation in a system according to various embodiments. A system executes 310 a boot process. The system may be any computing device capable of running entirely by battery power. Thus, portable devices such as notebooks, handheld devices, tablet computers, etc. may be considered systems in the context of discussing FIG. 3. The battery associated with the system may be a rechargeable battery such as, for example, a lithium-ion, nickel cadmium, nickel metal hydride, or other suitable type of rechargeable battery used in a computing device.

The system initiates 320 an automated calibration of the battery during execution of the boot process. In various embodiments, the automated battery calibration may be controlled by an extensible firmware interface (EFI). More specifically, in various embodiments, automated calibration is controlled by a Unified EFI (UEFI) available via the UEFI Forum of Beaverton, Oreg. In various embodiments, the EFI-managed battery calibration is single-threaded, meaning that commands are processed in sequence rather than in parallel. Accordingly, the EFI environment seizes complete control of the system during battery calibration.

UEFI, via its single-threaded calibration capability, is able to bypass power management functionality of the system OS, allowing the battery to cycle from fully charged to a fully discharged state without interruption on account of standby or hibernation states that may be enabled. In addition, operating systems frequently do not allow the battery to discharge fully or remain idle during normal operation.

The automated (e.g., no user intervention required) battery calibration is initiated in response to a trigger. Triggers may include a user initiated launch of a battery calibration process, a scheduling event scheduled via an operating system or via a dedicated scheduling module, a charge cycle count, or a battery error status signal. Other suitable triggers could also be used to initiate battery calibration. In embodiments where an operating system scheduling event triggers the battery calibration, a command (e.g., a WMI command) may be used to set a flag in the EFI and/or system BIOS to launch battery calibration on a future restart of the system. Thus, when the scheduled event occurs in the operating system, the event triggers the command (e.g., to set the flag in BIOS and/or EFI) and requests a restart of the system. A system user may select to restart the system immediately or defer the system restart.

The actual calibration process may be controlled by a calibration application executing within the EFI environment during a system boot process. The process of calibrating is selected based on various factors, for example, including battery type. Any suitable calibration process may be used, including those described above. Upon completion of the calibration, the boot process can continue to through system startup.

Figure 4:
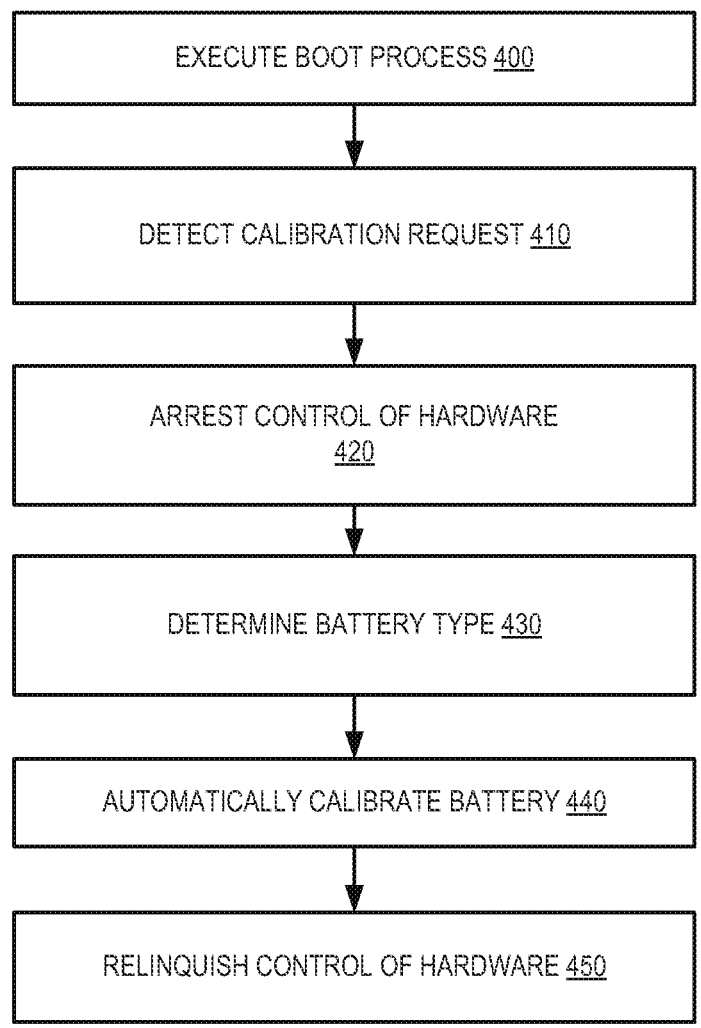
FIG. 4 is a flow diagram of operation in a system according to various embodiments.

FIG. 4 is another flow diagram of operation in a system according to various embodiments. A system having a rechargeable battery executes 400 a boot process. Example systems may include portable computing devices such as notebooks, handheld devices, tablet computers, and the like. The boot process is executed by a boot loader which is implemented, in various embodiments, as an extensible firmware interface (e.g., UEFI) that supplements or supplants BIOS firmware.

As part of the boot process, the system checks for battery calibration requests. Battery calibration requests can come directly from a user during execution of the boot process, they may be triggered by a condition (e.g., battery error status, cycle count threshold exceeded, etc.), or they may be scheduled (e.g., by an operating system, a dedicated scheduling module, etc.).

In various embodiments, the calibration process is initiated in response to detecting the calibration request, which includes arresting 420 control of system hardware. As discussed above, the EFI environment in various embodiments is single-threaded, allowing the calibration process to arrest control of system hardware.

The system determines 430 and/or provides the battery type. Based on the battery type, the battery is automatically calibrated 440. The calibration is automated in that no user intervention is required to perform the calibration (e.g., charging, discharging, etc.) on the battery. As mentioned above, the battery calibration occurs during execution of the system boot process. Other elements of the boot process may be performed before or after the calibration process. Once the calibration process is complete, the calibration process and/or the boot loader (e.g., EFI) the boot process may complete execution and pass system control to an operating system.

Various elements, modules and/or components described herein may be a means for performing the functions described herein.

The invention claimed is:

1. A method, comprising:
executing a boot process of a computing device;
initiating an automated calibration of a battery connected to the computing device during execution of the boot process;
seizing control of the computing device during the automated calibration; and
controlling the charging and discharging of the battery.

2. The method of claim 1, wherein the initiating of the automated calibration of the battery is triggered based on a user request.

3. The method of claim 1, wherein the initiating of the automated calibration of the battery is triggered based on a scheduling event.

4. The method of claim 1, wherein the initiating of the automated calibration of the battery is triggered based on at least one of a battery cycle count, battery age or a battery error status.

5. The method of claim 1, further comprising:
determining a battery type for the battery; and
performing the automated calibration of the battery based on the battery type.

6. A computer system, comprising:
a battery;
a controller to interface with the battery; and
an extensible firmware interface to perform an automated calibration of the battery via communication with the controller, wherein the extensible firmware interface further comprises a single-threaded Unified EFI (UEFI) calibration application to seize control of the computer system during the automated calibration of the battery and control charging and discharging of the battery.

7. The computer system of claim 6, further comprising:
operating system software to trigger the extensible firmware interface to commence the automated calibration of the battery.

8. The computer system of claim 6, further comprising:
a scheduler to trigger automated battery calibration on a periodic basis.

9. The computer system of claim 6, the single-threaded calibration application further to release control of the computer system upon completion of the calibration of the battery.

10. A non-transitory computer-readable storage medium containing instructions that, when executed, cause a computer to:
arrest control of hardware associated with the computer during a boot phase;
automatically calibrate a battery connected to the computer; and
seize control of the computer system during the automatic calibration and control charging and discharging of the battery.

11. The non-transitory computer-readable storage medium of claim 10, wherein the instructions that cause the automatic calibrating of the battery comprises further instructions that cause the computer to:
automatically calibrate the battery based on at least one of a user request or a event scheduled by an operating system.

12. The non-transitory computer-readable storage medium of claim 10, comprising further instructions that cause the computer to:
detect a battery type of the battery; and
automatically calibrate the battery based at least in part on the battery type.

13. The non-transitory computer-readable storage medium of claim 12, comprising further instructions that cause the computer to:
maintain a nearly constant power load applied to the battery for at least a portion of the automatic calibrating of the battery.

14. The non-transitory computer-readable storage medium of claim 12, wherein the instructions that cause the automatic calibrating of the battery comprise further instructions that cause the computer to:
automatically calibrate the battery based on at least one of a battery cycle count, a battery error signal, or battery age.

* * * * *